United States Patent
Mirmobin et al.

(10) Patent No.: US 9,322,300 B2
(45) Date of Patent: Apr. 26, 2016

(54) THERMAL CYCLE ENERGY AND PUMPING RECOVERY SYSTEM

(75) Inventors: Parsa Mirmobin, La Mirada, CA (US); Dennis Strouse, Anaheim, CA (US)

(73) Assignee: Access Energy LLC

( * ) Notice: Subject to any disclaimer, the term of this patent is extended or adjusted under 35 U.S.C. 154(b) by 93 days.

(21) Appl. No.: 13/556,821

(22) Filed: Jul. 24, 2012

(65) Prior Publication Data

US 2014/0028033 A1    Jan. 30, 2014

(51) Int. Cl.
| | | |
|---|---|---|
| H02N 10/00 | (2006.01) | |
| F01K 13/00 | (2006.01) | |
| F01K 25/08 | (2006.01) | |
| F03G 7/04 | (2006.01) | |

(52) U.S. Cl.
CPC .. *F01K 25/08* (2013.01); *F03G 7/04* (2013.01)

(58) Field of Classification Search
CPC .................................. F01K 25/08; F03G 7/04
USPC ......... 290/52; 60/641.2–641.4, 651, 671, 660
See application file for complete search history.

(56) References Cited

U.S. PATENT DOCUMENTS

| | | | | |
|---|---|---|---|---|
| 3,886,748 | A * | 6/1975 | Bronicki ........................ | 60/651 |
| 4,039,846 | A * | 8/1977 | Vance ........................... | 290/4 R |
| 4,117,344 | A * | 9/1978 | Boerstler et al. ................ | 290/52 |
| 5,755,556 | A | 5/1998 | Hultgreen et al. | |
| 6,880,344 | B2 * | 4/2005 | Radcliff et al. ................ | 60/772 |
| 7,124,584 | B1 * | 10/2006 | Wetzel et al. ................ | 60/641.2 |
| 7,629,701 | B2 * | 12/2009 | Campanile et al. ............... | 290/2 |
| 7,942,001 | B2 * | 5/2011 | Radcliff et al. ................ | 60/651 |
| 8,276,383 | B2 * | 10/2012 | Sami ............................... | 60/651 |
| 8,327,641 | B2 * | 12/2012 | Freund et al. ................ | 60/641.8 |
| 8,534,039 | B1 * | 9/2013 | Pierson et al. .............. | 60/39.182 |

(Continued)

FOREIGN PATENT DOCUMENTS

| | | |
|---|---|---|
| EP | 2500530 | 9/2012 |
| JP | 2011231636 | 11/2011 |

(Continued)

OTHER PUBLICATIONS

International Search Report and Written Opinion of the International Searching Authority issued in International Application No. PCT/US2014/035414 on Aug. 19, 2014; 9 pages.

(Continued)

*Primary Examiner* — Tulsidas C Patel
*Assistant Examiner* — Viet Nguyen
(74) *Attorney, Agent, or Firm* — Fish & Richardson P.C.

(57) ABSTRACT

Systems, methods, and apparatuses for pressure recovery and power generation may include a pressure recovery generator configured to receive a high-pressure fluid and generate current based on expansion of the high-pressure fluid. The current may be directed to a power electronics module that is configured to receive current from the pressure recovery generator and provide current to a closed-loop thermal cycle, such as an ORC. The current can be used to start components of the closed-loop thermal cycle, such as the pump and/or to black start the turbine generator. In some instances, the current can be combined with current generated by the closed-loop thermal cycle and directed to a utility grid or to external loads. The high-pressure fluid may be directed to heat exchanger components of the closed-loop cycle. For example, high-pressure, high-temperature fluid can be directed to an evaporator, while high-pressure, low-temperature fluid can be directed to a condenser.

34 Claims, 6 Drawing Sheets

(56) References Cited

U.S. PATENT DOCUMENTS

| | | |
|---|---|---|
| 2004/0020206 A1* | 2/2004 | Sullivan et al. ............... 60/670 |
| 2004/0055300 A1* | 3/2004 | Lawheed .................... 60/641.8 |
| 2006/0117753 A1* | 6/2006 | Bronicki ...................... 60/646 |
| 2007/0193265 A1 | 8/2007 | Skotte et al. |
| 2007/0277523 A1 | 12/2007 | Muller et al. |
| 2008/0163618 A1* | 7/2008 | Paul ............................ 60/407 |
| 2009/0165456 A1* | 7/2009 | Masada ........................ 60/531 |
| 2010/0050631 A1 | 3/2010 | Yager |
| 2010/0146949 A1* | 6/2010 | Stobart et al. ................. 60/300 |
| 2010/0194111 A1* | 8/2010 | Van Den Bossche et al. .... 290/2 |
| 2010/0263380 A1* | 10/2010 | Biederman et al. ............. 60/651 |
| 2010/0307155 A1* | 12/2010 | Kasuya et al. ................. 60/666 |
| 2010/0313565 A1 | 12/2010 | Kaplan et al. |
| 2010/0326076 A1* | 12/2010 | Ast et al. ....................... 60/671 |
| 2011/0115445 A1* | 5/2011 | Bronicki et al. ................ 322/24 |
| 2011/0187119 A1* | 8/2011 | McMaster ...................... 290/55 |
| 2011/0209473 A1 | 9/2011 | Fritz et al. |
| 2011/0209474 A1* | 9/2011 | Leibowitz .................... 60/641.1 |
| 2011/0289922 A1* | 12/2011 | Myers et al. ................... 60/651 |
| 2012/0000200 A1* | 1/2012 | Freund et al. .................. 60/645 |
| 2012/0073295 A1* | 3/2012 | Enokijima et al. ............. 60/660 |
| 2012/0090293 A1 | 4/2012 | Barrieu |
| 2012/0174581 A1* | 7/2012 | Vaughan et al. ............. 60/641.2 |
| 2012/0192563 A1* | 8/2012 | Kauffman et al. .............. 60/671 |
| 2012/0198839 A1 | 8/2012 | Nelson |
| 2012/0223531 A1* | 9/2012 | Brooks et al. ................. 290/1 R |
| 2012/0285169 A1 | 11/2012 | Freund et al. |
| 2012/0286524 A1* | 11/2012 | Bronicki ...................... 290/40 B |
| 2012/0299297 A1* | 11/2012 | Shortlidge et al. ................ 290/2 |
| 2012/0299311 A1* | 11/2012 | Biederman et al. ......... 290/40 B |
| 2013/0047613 A1* | 2/2013 | Holt et al. ....................... 60/645 |
| 2013/0056992 A1* | 3/2013 | Wada et al. ................... 290/1 A |
| 2013/0062890 A1* | 3/2013 | Saar et al. .................... 290/1 R |
| 2013/0081395 A1* | 4/2013 | Frey et al. .................... 60/641.8 |
| 2013/0207402 A1* | 8/2013 | Bronicki et al. .............. 290/1 R |
| 2014/0318131 A1 | 10/2014 | Artinian et al. |
| 2015/0107249 A1 | 4/2015 | Artinian et al. |

FOREIGN PATENT DOCUMENTS

| | | |
|---|---|---|
| KR | 10-2011-0116738 | 10/2011 |
| KR | 10-2013-0032222 | 4/2013 |
| WO | WO 99/67102 | 12/1999 |

OTHER PUBLICATIONS

Non final office action issued in U.S. Appl. No. 13/870,320, on Jan. 30, 2015, 18 pages.

PCT Notification of Transmittal of the International Search Report and Written Opinion of the International Searching Authority, PCT/US2014/035581, Jan. 28, 2016, 6 pages.

* cited by examiner

THERMAL CYCLE ENERGY AND PUMPING RECOVERY SYSTEM

FIELD

The present application is directed to pressure recovery systems.

BACKGROUND

Fluids used as heat sources for thermal cycles, such as Organic Rankine Cycles (ORC), are often under pressure, e.g. from water or oil well pressure, exhaust gasses, etc. High-pressure fluids can undergo pressure recovery for use in other systems and can be used to generate electricity.

SUMMARY

Certain aspects of the present disclosure involve pressure recovery systems in connection with closed-loop thermal cycles. The pressure recovery systems may include a pressure recovery generator configured to receive a high-pressure fluid at a fluid inlet and generate current based on a pressure change of the high-pressure fluid flowing from the fluid inlet to a fluid outlet. The pressure recovery systems may also include a power electronics module configured to receive current from the pressure recovery generator and provide current to the closed-loop thermal cycle.

Certain aspects of the present disclosure involve generating electrical current based on a pressure drop of a high-pressure fluid. Power may be provided to a closed-loop thermal cycle, the power a function of the electrical current directed to the power electronics module.

Certain aspects of the present disclosure are directed to systems that include a pressure recovery generator configured to receive a high-pressure fluid at a fluid inlet and generate current based on a pressure change of the high-pressure fluid flowing from the fluid inlet to a fluid outlet. The systems may also include a closed-loop thermal cycle. The closed-loop thermal cycle may include an evaporator configured to heat a working fluid, a turbine generator downstream from the evaporator and configured to generate current based on a pressure change of the working fluid flowing from an inlet to an outlet, and a condenser downstream from the turbine generator and configured to cool the working fluid. The system may also include a power electronics module configured to receive current from the pressure recovery generator and provide current to the closed-loop thermal cycle.

In certain implementations of the embodiments, the high-pressure fluid may be received from one or more of a water well, an oil well, a natural gas well, an injected well, another process, geothermal sources, or a reverse osmosis process.

In certain implementations of the embodiments, the closed-loop thermal cycle is an organic Rankine cycle.

In certain implementations of the embodiments, the pressure recovery generator outputs an alternating current and the pressure recovery system includes a converter that converts alternating current into a direct current.

In certain implementations of the embodiments, the converter includes a rectifier circuit. The converter may include a cycloconverter. The system may also include a switch circuit operable to selectively direct current from the power electronics module to the closed-loop thermal cycle or to direct current from the closed-loop thermal cycle and cyclic converter to a utility grid. In some implementations of the embodiments, the converter may include a matrix converter, and the system further comprises a switch operable to selectively direct current from the closed-loop thermal cycle and the matrix converter to a utility grid.

In certain implementations of the embodiments, the high-pressure fluid includes a high-temperature fluid and the system directs the high-pressure fluid from the pressure recovery generator to an evaporator of the closed-loop thermal cycle. The evaporator may be configured to heat a working fluid of the closed-loop thermal cycle using the high-pressure fluid.

In certain implementations of the embodiments, the high-pressure fluid includes a low-temperature fluid and the system directs the high-pressure fluid from the pressure recovery generator to a condenser of the closed-loop thermal cycle. The condenser may be configured to cool a working fluid of the closed-loop thermal cycle using the high-pressure fluid.

Certain implementations of the embodiments may also include a bypass valve. The bypass valve may be configured to receive the high-pressure fluid from the pressure recovery generator and selectively direct the high-pressure fluid to a heat-transfer component of the closed-loop thermal cycle or to other processes or injected into wells or storage tanks.

In certain implementations of the embodiments, the power electronics may also include a direct current bus configured to direct current from the pressure recovery generator and provide current to a closed-loop thermal cycle. The direct current bus may be coupled to the pressure recovery generator and the closed-loop thermal cycle.

In certain implementations of the embodiments, the pressure recovery generator may include a turbine wheel configured to rotate based on an expansion of the high-pressure fluid flowing from the fluid inlet to the fluid outlet. The pressure recovery generator may also include a rotor coupled to the turbine wheel. The rotor may be configured to rotate within a stator and generate current upon rotation of the turbine wheel.

In certain implementations of the embodiments, the power electronics module may be electrically coupled to one or both of a turbine generator apparatus of the closed-loop thermal cycle or a pump of the closed-loop thermal cycle. The power electronics modules can direct current to the turbine generator apparatus and/or the pump to start each of these components.

Certain aspects of the implementations also include directing the pressurized fluid away from the closed-loop thermal cycle.

In certain implementations of the embodiments, the electrical current generated by the pressure recovery generator is an alternating current. The electrical current can be converted to a direct current prior to the electrical current being received by the power electronics module.

Certain aspects of the implementations also include rotating a turbine wheel of a turbine generator of the closed-loop thermal cycle with the power provided from the power electronics module.

Certain aspects of the implementations also include directing the electrical current to a utility grid or external loads.

Certain aspects of the implementations also include starting one or more components of the close-loop thermal cycle using current generated by the pressure recovery generator.

In certain implementations of the embodiments, the power is a function of the electrical current directed to the power electronics module from the pressure recovery generator.

In certain implementations of the embodiments, the high-pressure fluid is a high temperature fluid and the evaporator is configured to heat the working fluid using the high-pressure fluid.

In certain implementations of the embodiments, the high-pressure fluid is a low temperature fluid and the condenser is configured to cool the working fluid using the high-pressure fluid.

In certain implementations of the embodiments, the pressure recovery generator is a first pressure recovery generator and the high-pressure fluid is a high temperature fluid, and the system comprises a second pressure recovery generator configured to receive a low-temperature, high-pressure fluid at a fluid inlet and generate current based on a pressure change of the low-temperature, high-pressure fluid flowing from the fluid inlet to a fluid outlet.

In certain implementations of the embodiments, the power electronics module is configured to direct a current generated by the pressure recovery generator to one of the closed-loop thermal cycle or a utility grid.

In certain implementations of the embodiments, the closed-loop thermal cycle is an organic Rankine cycle.

The details of one or more embodiments of the disclosure are set forth in the accompanying drawings and the description below. Other features, objects, and advantages will be apparent from the description and drawings, and from the claims.

DETAILED DESCRIPTION

The energy stored within the fluid stream, in the form of pressure, can be utilized to start an ORC and thereafter supplement the electric power generated by the ORC. This invention describes a means for multiple pressure recovery systems, such as well head pressure exchanger or turbo alternator, to provide electric power to start an ORC system. Once the ORC has started the power of all systems can be combined using power electronics of the ORC system. In particular, the DC bus of the ORC power electronics can be used to acquire rectified power from pressure recovery systems. This power can in turn be used to start the ORC. Once the ORC is in operation the power of pressure recovery systems and ORC can be combined within the same DC bus and utilized thereafter.

Alternatively, the power from pressure recovery generator can be used to start the ORC using a matrix converter or Cycloconverter. In either case the frequency (and power of ORC) is monitored by the converter and switches or circuit breakers are actuated to connect to the ORC and/or utility grid. In the case of a matrix converter a single switch can be used to isolate both the ORC and matrix converter. After start, the switch is actuated to allow power from both ORC and matrix converter to flow to the utility grid.

Using the Cycloconverter the high frequency power from pressure recovery exchanger is converted to utility frequency. With switch S1 and S3 open and S2 closed, power is fed to the ORC to start the system. Once the ORC has started switch S2 is opened and S1 and S3 closed, allowing power from ORC and Cycloconverter to flow to the utility grid independently.

Figure 1A:
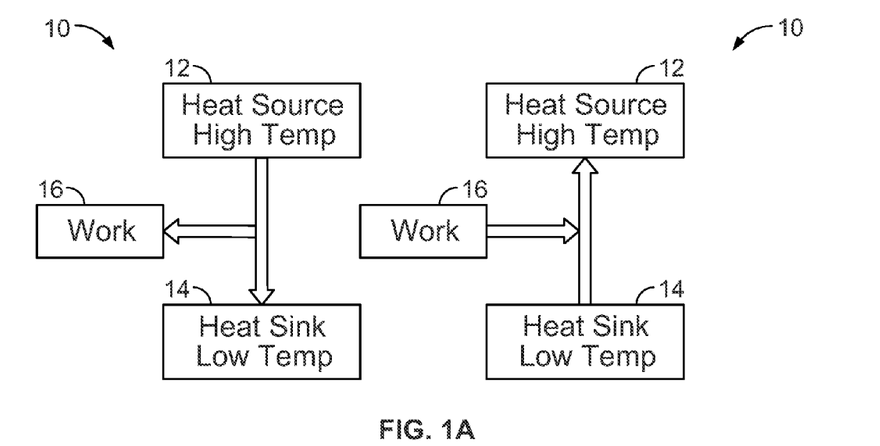
FIG. 1A is a schematic diagram of an example thermal cycle.

FIG. 1A is a schematic diagram of an example thermal cycle 10. The cycle consists of a heat source 12 and a heat sink 14. The heat source temperature is greater than heat sink temperature. Flow of heat from the heat source 12 to heat sink 14 is accompanied by extraction of heat and/or work 16 from the system. Conversely, flow of heat from heat sink 14 to heat source 12 is achieved by application of heat and/or work 16 to the system. Extraction of heat from the heat source 12 or application of heat to heat sink 14 is achieved through a heat exchanging mechanism. Systems and apparatus described in this disclosure are applicable to any heat sink 14 or heat source 12 irrespective of the thermal cycle. For descriptive purposes, a Rankine Cycle (or Organic Rankine Cycle) is described by way of illustration, though it is understood that the Rankine Cycle is an example thermal cycle, and this disclosure contemplates other thermal cycles.

Figure 1B:
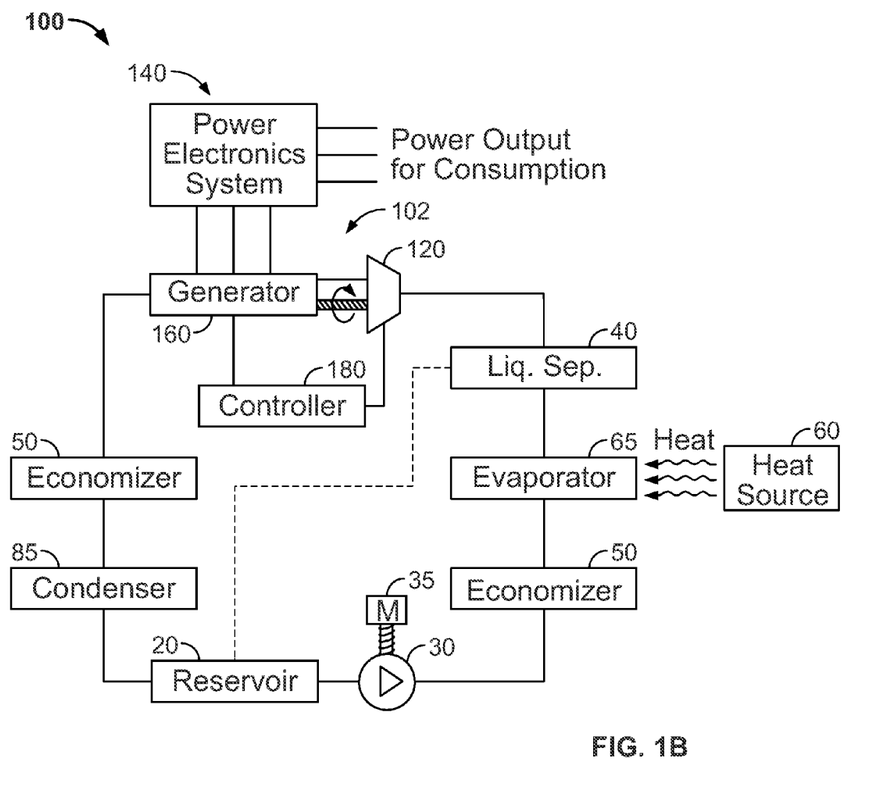
FIG. 1B is a schematic diagram of an example Rankine Cycle system illustrating example Rankine Cycle system components.

FIG. 1B is a schematic diagram of an example Rankine Cycle system illustrating example Rankine Cycle system components. Elements of the Rankine Cycle 100 may be integrated into pressure recovery system and recover waste heat therefrom. The Rankine Cycle 100 may be an Organic Rankine Cycle ("Rankine Cycle"), which uses an engineered working fluid to receive waste heat from another process, such as, for example, from the compressor+engine that the Rankine Cycle system components are integrated into. In certain instances, the working fluid may be a refrigerant (e.g., an HFC, CFC, HCFC, ammonia, water, R245fa, or other refrigerant). In some circumstances, the working fluid in cycle 100 may include a high molecular mass organic fluid that is selected to efficiently receive heat from relatively low temperature heat sources. As such, the turbine generator apparatus 102 can be used to recover waste heat and to convert the recovered waste heat into electrical energy.

In certain instances, the turbine generator apparatus 102 includes a turbine 120 and a generator 160. The turbine generator apparatus 102 can be used to convert heat energy from a heat source into kinetic energy (e.g., rotation of the rotor), which is then converted into electrical energy. The turbine 120 is configured to receive heated and pressurized gas, which causes the turbine 120 to rotate (and expand/cool the gas passing through the turbine 120). Turbine 120 is coupled to a rotor of generator 160 using, for example, a common shaft or a shaft connected by a gear box. The rotation of the turbine 120 causes the shaft to rotate, which in-turn, causes the rotor of generator 160 to rotate. The rotor rotates within a stator to generate electrical power. For example, the turbine generator apparatus 102 may output electrical power that is configured by a power electronics package to be in form of 3-phase 60 Hz power at a voltage of about 400 VAC to about 480 VAC. Alternative embodiments may output electrical power at different power and/or voltages. Such electrical power can be transferred to a power electronics system 140 and/or other electrical driven and, in certain instances, to an electrical power grid system. Turbine may be an axial, radial, screw or other type turbine. The gas outlet from the turbine 120 may be coupled to the generator 160, which may receive the gas from the turbine 120 to cool the generator components.

Rankine Cycle 100 may include a pump device 30 that pumps the working fluid. The pump device 30 may be coupled to a liquid reservoir 20 that contains the working fluid, and a pump motor 35 can be used to operate the pump. The pump device 30 may be used to convey the working fluid to an evaporator/preheater heat exchanger 65. Evaporator/preheater heat exchanger 65 may receive heat from a heat source 60, such as a waste heat source from one or more heat sources. Example sources of heat include heat from gas processing system/plant, compression, engine exhaust, engine jacket water, system air coolers, or natural streams such as geothermal wells etc. In certain implementations, the heat source is a high-temperature fluid received from a pressure recovery generator located upstream from a high-pressure fluid source. In such circumstances, the working fluid may be directly heated or may be heated in a heat exchanger in which the working fluid receives heat from a byproduct fluid of the process. In certain instances, the working fluid can cycle through the heat source 60 so that at least a substantial portion of the fluid is converted into gaseous state.

Typically, working fluid at a low temperature and high pressure liquid phase from the pump device 30 is circulated into one side of the economizer 50, while working fluid that has been expanded by a turbine upstream of a condenser is at a high temperature and low pressure vapor phase and is circulated into another side of the economizer 50 with the two sides being thermally coupled to facilitate heat transfer there between. Although illustrated as separate components, the economizer 50 (if used) may be any type of heat exchange device, such as, for example, a plate and frame heat exchanger, a shell and tube heat exchanger or other device.

The evaporator/preheater heat exchanger 65 may receive the working fluid from the economizer 50 at one side and receive a supply of thermal fluid (that is (or is from) the heat source 60) at another side, with the two sides of the evaporator/preheater heat exchanger 65 being thermally coupled to facilitate heat exchange between the thermal fluid and working fluid. For instance, the working fluid enters the evaporator/preheater heat exchanger 65 from the economizer 50 in liquid phase and is changed to a vapor phase by heat exchange with the thermal fluid supply. The evaporator/preheater heat exchanger 65 may be any type of heat exchange device, such as, for example, a plate and frame heat exchanger, a shell and tube heat exchanger or other device.

In certain instances of the Rankine Cycle 100, the working fluid may flow from the outlet conduit of the turbine generator apparatus 102 to a condenser heat exchanger 85. The condenser heat exchanger 85 is used to remove heat from the working fluid so that all or a substantial portion of the working fluid is converted to a liquid state. In certain instances, a forced cooling airflow or water flow is provided over the working fluid conduit or the condenser heat exchanger 85 to facilitate heat removal. After the working fluid exits the condenser heat exchanger 85, the fluid may return to the liquid reservoir 20 where it is prepared to flow again though the Rankine Cycle 100. In certain instances, the working fluid exits the generator 160 (or in some instances, exits a turbine 120) and enters the economizer 50 before entering the condenser heat exchanger 85.

Liquid separator 40 (if used) may be arranged upstream of the turbine generator apparatus 102 so as to separate and remove a substantial portion of any liquid state droplets or slugs of working fluid that might otherwise pass into the turbine generator apparatus 102. Accordingly, in certain instances of the embodiments, the gaseous state working fluid can be passed to the turbine generator apparatus 102, while a substantial portion of any liquid-state droplets or slugs are removed and returned to the liquid reservoir 20. In certain instances of the embodiments, a liquid separator may be located between turbine stages (e.g., between the first turbine wheel and the second turbine wheel, for multi-stage expanders) to remove liquid state droplets or slugs that may form from the expansion of the working fluid from the first turbine stage. This liquid separator may be in addition to the liquid separator located upstream of the turbine apparatus.

Controller 180 may provide operational controls for the various cycle components, including the heat exchangers and the turbine generator. Controller 180 is similar to the programmable logic controller described in more detail below.

Figure 2:
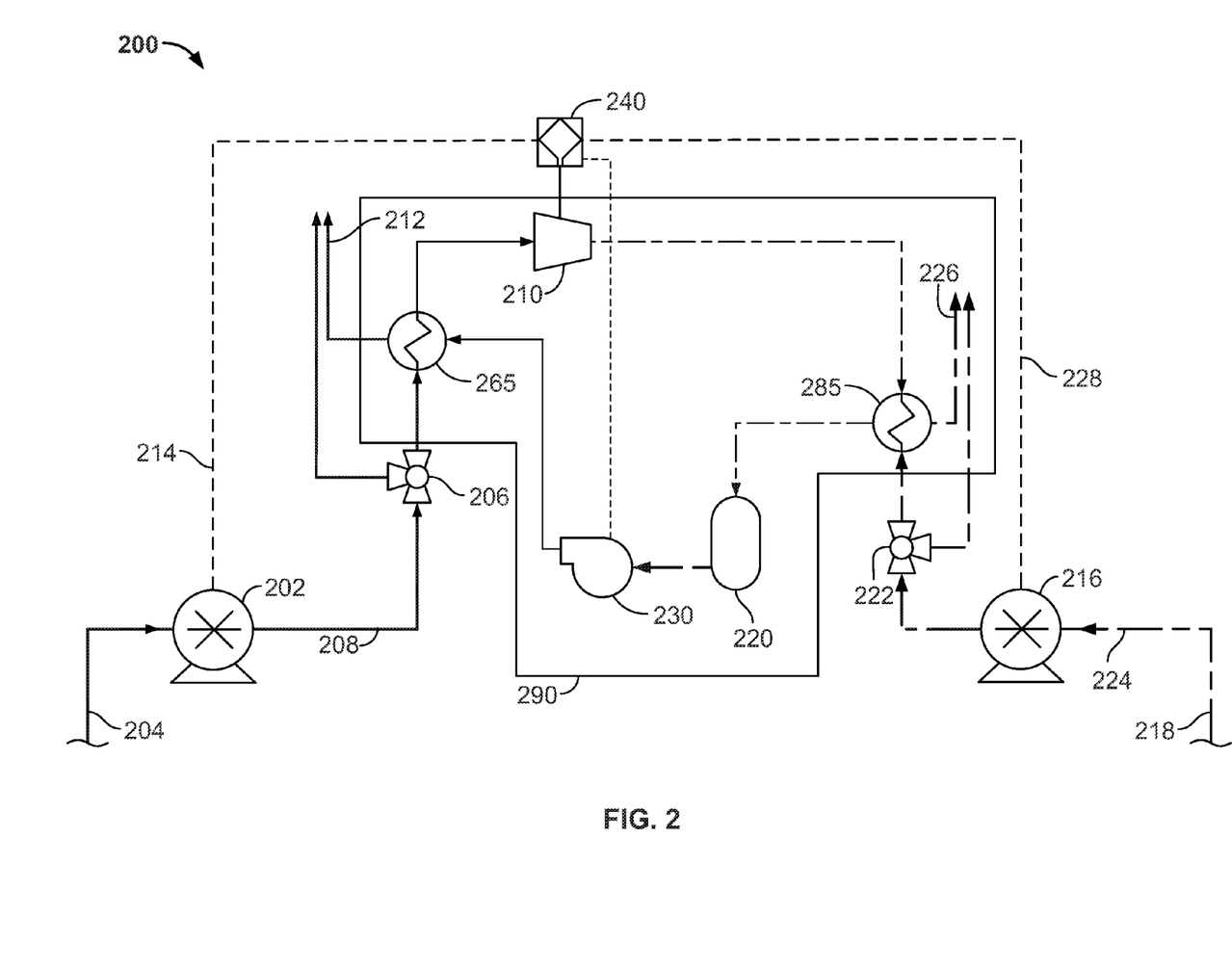
FIG. 2 is a schematic block diagram of a closed loop cycle connected to a pressure recovery generator.

FIG. 2 is a schematic block diagram of a pressure recovery system 200 that includes a closed-loop thermal cycle 290 connected to a pressure recovery generator. The closed-loop thermal cycle 290 is similar to the thermal cycles described above for FIGS. 1A-1B. The closed-loop thermal cycle 290 includes a working fluid reservoir 220 for storing working fluid. Pump 230 can pump low temperature working fluid from the reservoir 220 to a heat exchanger, such as evaporator 265. The pressurized working fluid is heated by the evaporator 265. Heat is provided to the evaporator from a high-temperature fluid 208 received from pressure recovery generator 202. The high-temperature fluid 204 can be a high-pressure, high temperature fluid 204 received from a high-pressure fluid source, such as a water or oil well, exhaust gas from another process, geothermal sources or natural gas wells as well as injected wells, return water from reverse osmosis process, etc., or a combination thereof. The high-pressure, high-temperature fluid from the evaporator can be directed to an evaporator outlet 212.

The heated and pressurized working fluid can be directed to a turbine generator apparatus 210. Turbine generator apparatus 210 can include a turbine wheel having a fluid inlet and a fluid outlet. The heated and pressurized working fluid can be directed to the fluid inlet of a turbine wheel of the turbine generator apparatus 210. The heated and pressurized working fluid can cause the turbine wheel to rotate as the working fluid flows from the fluid inlet to the fluid outlet. The turbine wheel can be mechanically coupled to a rotor that rotates upon rotation of the turbine wheel. The rotor rotates within a stator to generate electrical current. The electrical current can be directed to a power electronics module 240.

The working fluid can be directed to a heat exchanger, such as condenser 285 and then to the reservoir 220. The condenser 285 can cool the working fluid. The condenser 285 can cool the working fluid by transfer heat to another fluid 226. The cooling fluid 226 for the condenser 285 can be received from a second pressure recovery generator 216. The pressure recovery generator 216 can receive a low-temperature, high-pressure fluid 218 from a high-pressure source. The now lower-pressure, low-temperature fluid 224 can be further utilized to condense the ORC working fluid.

The pressure recovery generator 202 can be used to generate electrical current 214, which can be directed to the power electronics module 240. Similarly, pressure recovery generator 216 can be used to generate electrical current 228 that is also directed to the power electronics module 240. The pressure recovery generator 202 (and 216) can include a turbine wheel that includes a fluid inlet and a fluid outlet. The turbine wheel can rotate when the high-pressure fluid flows from the inlet to the outlet. The flow of the high-pressure fluid can cause the fluid to expand and the pressure of the high-pressure fluid can drop as it flows from the fluid inlet to the fluid outlet. The turbine wheel can be mechanically coupled to a rotor. The rotor can rotate upon rotation of the turbine wheel. The rotor can be suspended mechanically or magnetically within a stator, which generates current based on rotation of the rotor. The turbine wheel can rotate based on the expansion of a liquid, a gas, or a combination of the two. The power electronics module 240 can be used to power the turbine generator 210 for start-up, and can provide power to other components of the closed-loop thermal cycle, such as the pump 230.

In certain implementations, a three-way valve 206 can reside downstream of the pressure recovery generator 202. The three-way valve 206 can selectively direct the high-temperature, high-pressure fluid 208 to either the evaporator 265 or to an exhaust outlet. Similarly, a three-way valve 222 can reside downstream of the pressure recovery generator 216. The three-way valve 222 can selectively direct the low-temperature, high-pressure fluid 224 to either the condenser 285 or to an exhaust outlet.

Figure 3:
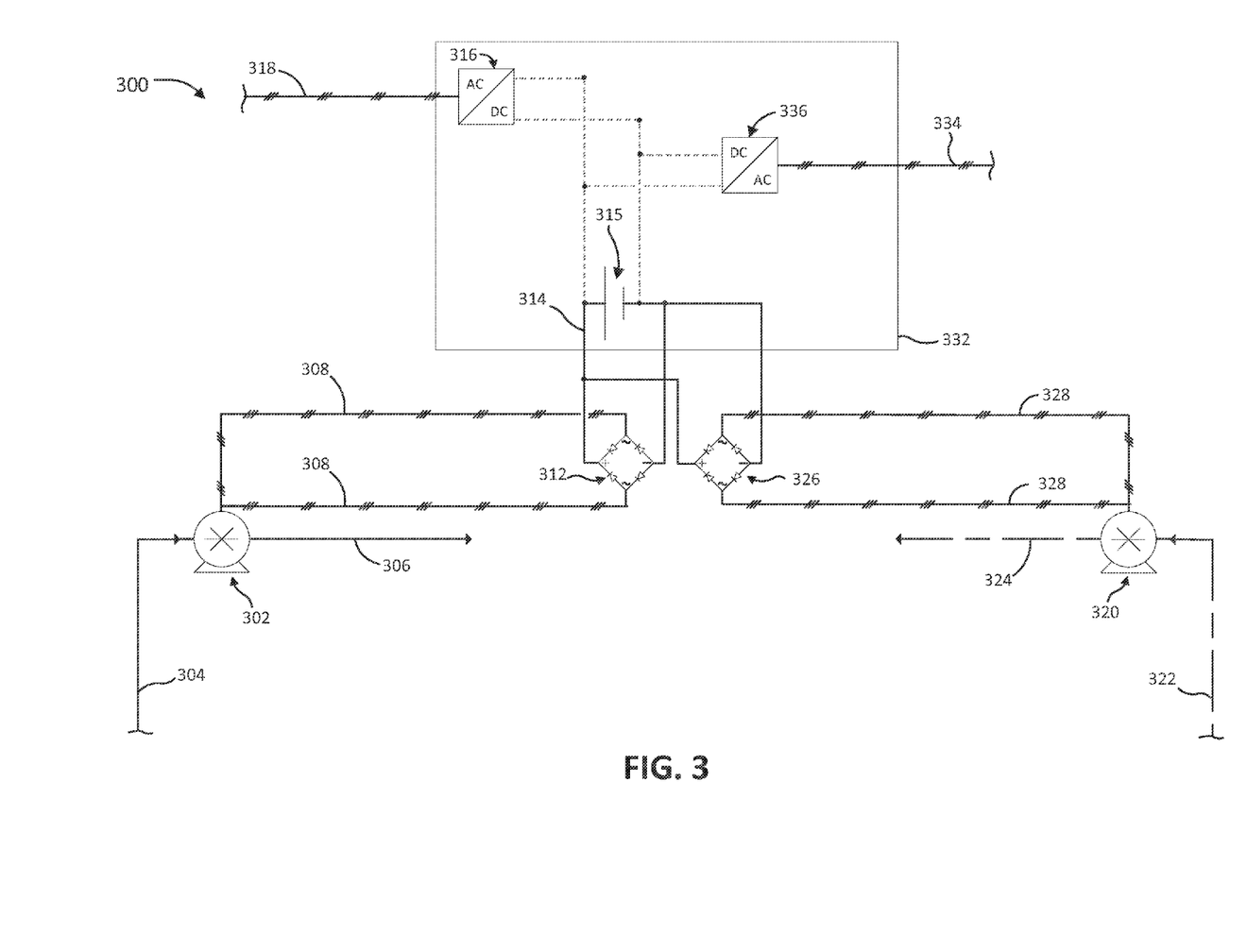
FIG. 3 is a schematic block diagram of electrical connections for providing power to a closed loop thermal cycle from a pressure recovery generator and exporting power to utility grid or external loads.

FIG. 3 is a schematic block diagram 300 of electrical connections for providing power to a closed loop thermal cycle from a pressure recovery generator. In the example implementation shown in FIG. 3, a pressure recovery generator 302 can receive a high-temperature, high-pressure fluid 304 from a high-pressure fluid source. The high-temperature, high-pressure fluid can cause the pressure recovery generator 302 to generate an electrical current 308. The high-temperature, high pressure fluid 306 can be output from the pressure recovery generator and directed to a heat exchanger of a closed-loop thermal cycle, such as to an evaporator of an ORC, or can be directed elsewhere.

The electrical current 308 may be an alternating current. A circuit or circuit element can change or shape the alternating current (AC) to remove the alternating polarities of the AC; in some implementations, the circuit element may convert the AC to a direct current (DC). In the implementation shown in FIG. 3, the circuit is a rectifier circuit 312 that includes a diode bridge, which can provide full-wave rectification of the AC, where the polarity of the current output from the diode bridge is the same regardless of the input. Other circuits may be used, and are discussed below. The rectifier circuit 312 can output direct current on a DC bus 314 to a power electronics module 332, which may be associated with a closed-loop thermal cycle, such as an ORC.

As mentioned above, the power electronics module 332 may be associated with closed-loop thermal cycle, such as an ORC. The power electronics module 332 may receive an alternating current 318 (e.g., a three-phase alternating current) from the closed-loop thermal cycle. The alternating current 318 can be directed to an AC/DC converter 316, which converts the alternating current 318 to a direct current. The direct current from AC/DC converter 316 can be output on the same DC bus 314 as the rectified current from the rectifier circuit 312. The direct current can also be directed to a DC/AC converter 336. The alternating current 334 can be directed to the closed-loop thermal cycle to power components of the ORC or may be directed to a utility grid or other external loads. The rectified current on the DC bus 314 can also be directed to the DC/AC converter 336, and output to the closed-loop thermal cycle to power closed-loop thermal cycle components or to a utility grid or other external loads.

In some implementations, a second pressure recovery generator 320 can be used. The pressure recovery generator 320 can receive a high-pressure, low-temperature fluid 322. The pressure recovery generator 320 can generate alternating current 328 based on receiving the high-pressure, low temperature fluid 322 (e.g., in some implementations, the pressure recover generator can include a turbine wheel, and the high-pressure, low temperature fluid 322 expands as it causes the turbine wheel of the example pressure recovery generator to rotate). The now lower-pressure, low-temperature fluid 324 can be directed to a heat exchanger of the closed-loop thermal cycle, such as to a condenser an ORC, or it can be directed elsewhere. The alternating current 328 can be directed to a rectifier circuit 326, which in the implementation shown in FIG. 3 is a diode bridge circuit that provides full-wave rectification of the alternating current 328. The rectified current is output from the rectifier circuit 326 and directed to the power electronics module 332 on a DC bus 314. The DC bus may be the same DC bus 314 as that which directs the rectified current from rectifier circuit 312 to the power electronics module 332. The rectified current can be directed to a DC/AC converter 336, which converts the rectified current into an alternating current 334. Alternating current 334 can be directed to the closed-loop thermal cycle to power components of the closed-loop thermal cycle, or can be directed to a utility grid or other external loads.

The power electronics module 322 may include a DC link 315. DC link 315 may reside between the rectifier circuit(s) 312 (and 326) and the AC/DC converter 316 and/or the DC/AC converter 336. The DC link may include a decoupling capacitor in the DC link. The DC link capacitor helps to keep these transients at the switching frequency from radiating back to the input. Additionally, if the input is not multiple-phase, the capacitor helps provide a source of energy when the input waveform is near zero.

Figure 4:
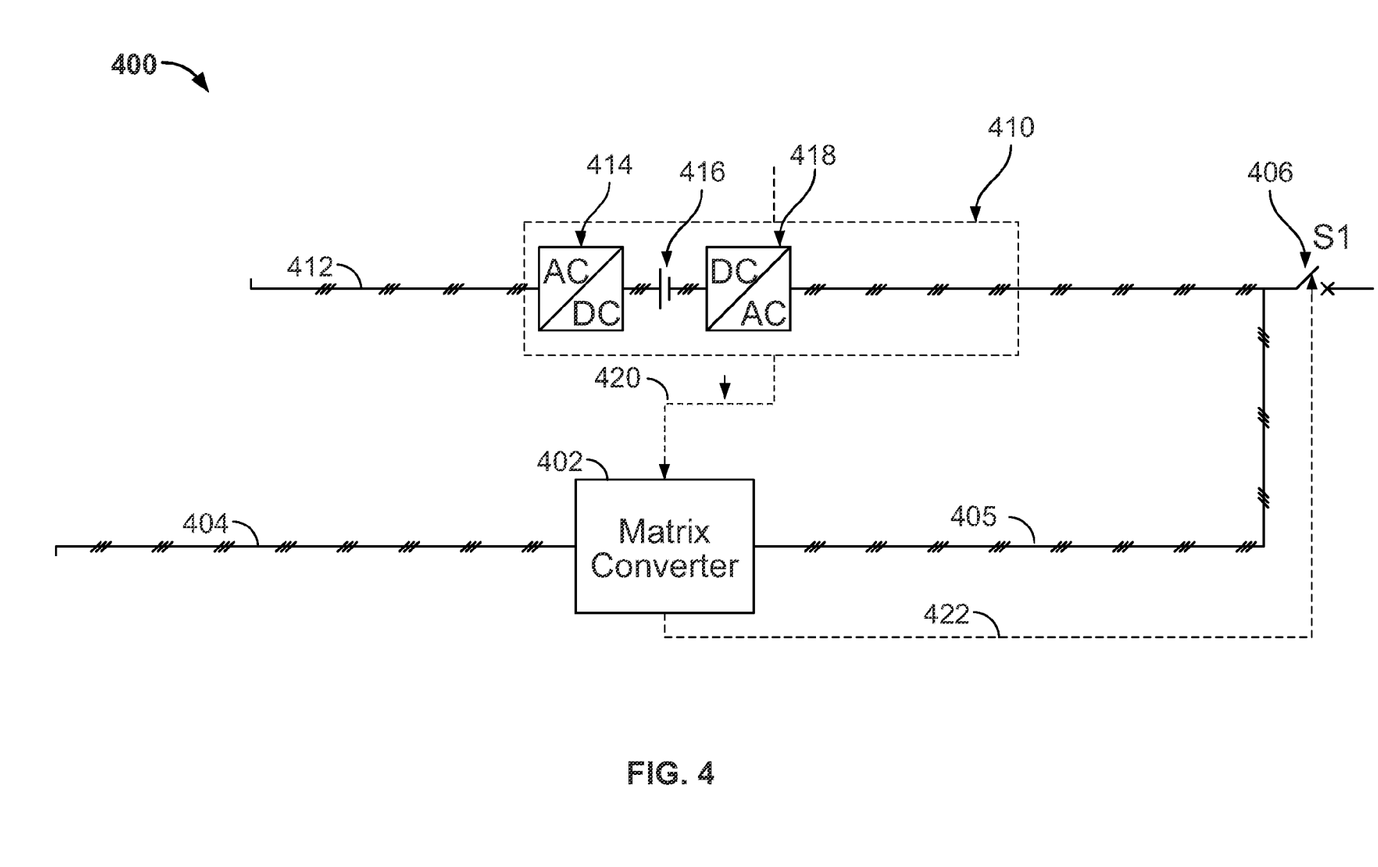
FIG. 4 is a schematic diagram of an example electrical circuit including a matrix converter.

In some implementations, the power from pressure recovery generator can be used to start the ORC using a matrix converter or a Cycloconverter. In either case the frequency (and power of ORC) is monitored by the converter and switches or circuit breakers are actuated to connect to the ORC and/or utility grid. FIG. 4 is a schematic diagram of an example electrical circuit 400 including a matrix converter 402. Alternating current 404 from the pressure recovery generator is directed to an input of the matrix converter 402. The matrix converter 402 provides sinusoidal input and output waveforms, with minimal higher order harmonics and no sub-harmonics. The matrix converter 402 has inherent bi-directional energy flow capability. The input power factor can be fully controlled. Additionally, the matrix converter 402 has minimal energy storage requirements. The matrix converter 402 can "sense" the frequency and/or power from the power electronics 410 based on a frequency/power signal 420, and can provide a signal 422 to control switch S1 406.

The output 405 of the matrix converter 402 can be directed to a bus that connects to a utility grid. A switch 406 can be used to isolate both the power electronics module 410 and matrix converter 402. With the switch 406 open, power from the power electronics module 410 and/or the matrix converter 402 can be used to start the closed-loop thermal cycle. For example, the alternating current from the power electronics/matrix converter can be used to start the flow of a working fluid for the closed-loop thermal cycle by starting a pump and/or starting the rotation of a turbine wheel. Once the closed-loop thermal cycle has been started, the power electronics module 410 can receive alternating current 412 from the closed-loop thermal cycle generator. The power electronics module 410 can include an AC/DC converter 414 that receives the alternating current 412. The AC/DC converter 414 converts the alternating current 412 to a direct current, which is stored in a capacitor 416, DC link, or other storage circuit or device. A DC/AC converter 418 can convert the direct current to an alternating current (e.g., a three-phase alternating current), which the power electronics module 410 can output to a utility grid. After starting the closed-loop thermal cycle, the switch 406 can be actuated to allow power from both power electronics module 410 and matrix converter 402 to flow to the utility grid. The matrix converter 402 can synchronize to the ORC output power and provide power to the utility grid or other external loads.

Figure 5:
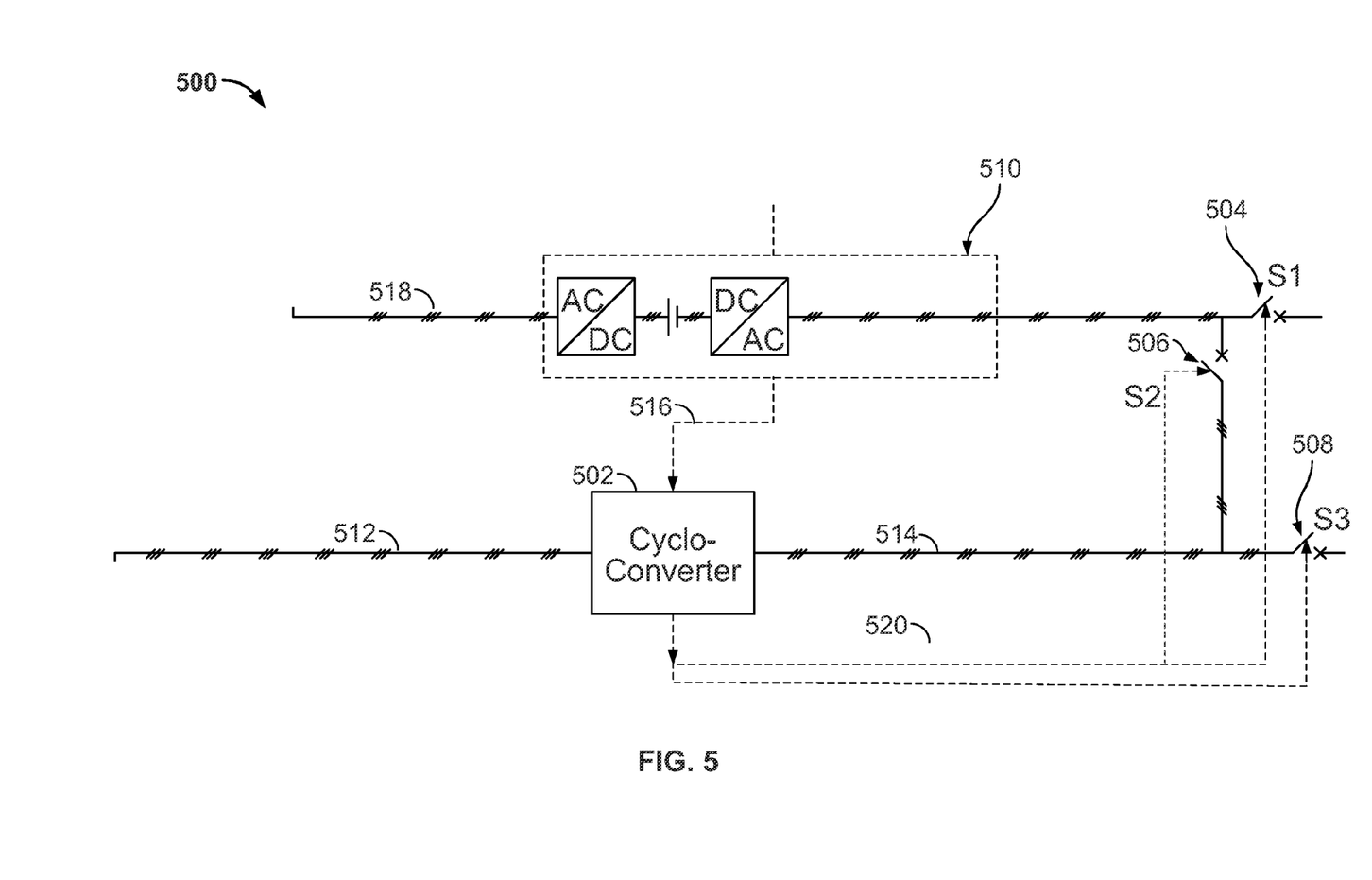
FIG. 5 is a schematic diagram of an example electrical circuit including a cyclo-converter.

FIG. 5 is a schematic diagram of an example electrical circuit 500 including a cyclo-converter 502. Cycloconverter 502 can receive alternating current 512 from a pressure recovery generator. Cycloconverter 502 can convert a constant voltage, constant (or fixed) frequency AC waveform to another AC waveform of a lower frequency by synthesizing the output waveform from segments of the AC supply (and in some instances, without an intermediate DC link). The cycloconverter 502 outputs an alternating current 514 on a bus that is selectively coupled to the output of power electronics 510. Using the Cycloconverter, the high frequency power from pressure recovery exchanger is converted to utility frequency. Cycloconverter 502 can receive a signal 516 from the ORC power electronics 510 that indicates a frequency and/or power output of the power electronics 510. Based on the signal 516, the cycloconverter can provide a signal 520 to control one or more switches to direct its output 514, as described below.

With switch S1 504 and S3 508 open and S2 506 closed, power is fed to the closed-loop thermal cycle to start the closed-loop thermal cycle system (e.g., to get the working fluid to flow through the cycle by starting the pump and revolving the turbine wheel). Current 518 can be directed to the ORC generator. Once the closed-loop thermal cycle has started, switch S2 506 can be opened and S1 504 and S3 508 closed, allowing power from closed-loop thermal cycle and cycloconverter to flow to the utility grid independently.

Figure 6:
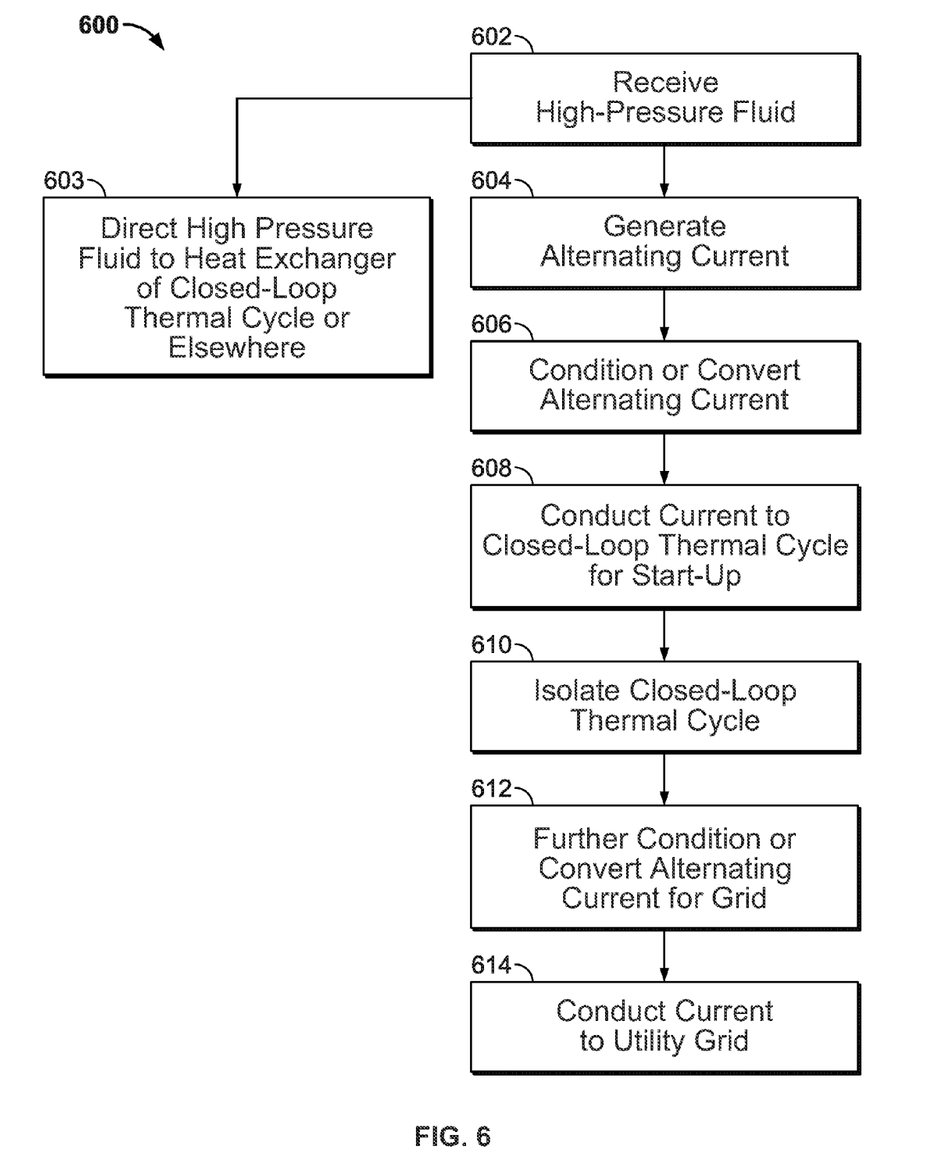
FIG. 6 is a process flow diagram for providing power to a closed loop thermal cycle from a pressure recovery generator.

FIG. 6 is a process flow diagram 600 for providing power to a closed loop thermal cycle from a pressure recovery generator. A pressure recovery generator can receive a high-pressure fluid from a high-pressure source (602). The high-pressure fluid can be directed to a heat exchanger of a closed-loop thermal cycle (603). For example, high-temperature, high-pressure fluid can be directed to an evaporator of an ORC. Low-temperature, high-pressure fluid can be directed to a condenser of an ORC. The pressure recovery generator can generate alternating current based on receiving high-pressure fluid (604). The alternating current can be adjusted or altered to prepare or condition the current for use or storage (606). For example, the alternating current can be directed to a power electronics module through a rectifier circuit, such as a bridge rectifier. The alternating current can be stored in the power electronics module, and further conditioned for use in starting-up components of the closed-loop thermal cycle or directed to a utility grid. For example, the rectified current can be directed to a DC/AC converter and converted to alternating current in the proper frequency and phase for a utility grid. In some implementations, the alternating current can be directed to an AC/AC converter circuit, such as a matrix converter or a cycloconverter.

The conditioned alternating current can be used to start-up components of a closed loop thermal cycle (608). Once started, power electronics module output (and the electrical output from the matrix converter and/or cycloconverter) can be isolated from the closed-loop thermal cycle (610). Once started, the closed-loop thermal cycle can be used to generate alternating current, which is also directed to the power electronics module. The alternating current from the pressure recovery device can be further conditioned and directed to a utility grid, along with conditioned current from the closed-loop thermal cycle (612). Such conditioning can include AC/DC-DC/AC conversion, synchronization, frequency and phase modulation, etc. The conditioned current can be directed to a utility grid (614).

A number of embodiments have been described. Nevertheless, it will be understood that various modifications may be made. Accordingly, other embodiments are within the scope of the following claims:

What is claimed is:

1. A system comprising:
    a closed-loop thermal cycle comprising a turbine generator and a working fluid, the closed-loop thermal cycle configured to generate current based on heat exchanged with the working fluid;
    a first pressure recovery generator configured to receive a second fluid at a first fluid inlet and generate current based on a pressure change of the second fluid flowing from the first fluid inlet to a first fluid outlet;
    a second pressure recovery generator configured to receive a third fluid at a second fluid inlet and generate current based on a pressure change of the third fluid flowing from the second fluid inlet to a second fluid outlet, a temperature or pressure or both of the third fluid different from a temperature or pressure or both of the second fluid; and
    a power electronics module configured to receive the current from the first pressure recovery generator and from the second pressure recovery generator, and provide the current to the closed-loop thermal cycle, and to receive the current from the closed-loop thermal cycle.

2. The system of claim 1, wherein the first pressure recovery generator fluid inlet is coupled to one or more of a water well, an oil well, a natural gas well, an injected well, another process, geothermal sources, or a reverse osmosis process to receive the second fluid.

3. The system of claim 1, wherein the closed-loop thermal cycle is an organic Rankine cycle.

4. The system of claim 1, wherein the first pressure recovery generator outputs an alternating current and the pressure recovery system includes a converter that converts alternating current into a direct current.

5. The system of claim 4, wherein the converter includes a rectifier circuit.

6. The system of claim 4, wherein the converter is a cycloconverter, and the system further comprises a switch circuit operable to selectively direct current from the power electronics module to the closed-loop thermal cycle or to direct current from the closed-loop thermal cycle and cyclic converter to a utility grid.

7. The system of claim 4, wherein the converter includes a matrix converter, and the system further comprises a switch operable to selectively direct current from the closed-loop thermal cycle and the matrix converter to a utility grid.

8. The system of claim 1, wherein the first pressure recovery generator is an open thermal system, wherein the system outputs the second fluid to exit the first pressure recovery generator to an evaporator of the closed-loop thermal cycle, the evaporator configured to heat the working fluid of the closed-loop thermal cycle using the fluid.

9. The system of claim 1, wherein the first pressure recovery generator is an open thermal system, wherein the system outputs the second fluid to exit the first pressure recovery generator to a condenser of the closed-loop thermal cycle, the condenser configured to cool the working fluid of the closed-loop thermal cycle using the second fluid.

10. The system of claim 1, further comprising a bypass valve configured to receive the second fluid from the first pressure recovery generator and selectively direct the second fluid to a heat-transfer component of the closed-loop thermal cycle or to other processes or injected into wells or storage tanks.

11. The system of claim 1, wherein the power electronics module further comprises a direct current bus configured to direct current from the first pressure recovery generator and provide current to the closed-loop thermal cycle and wherein the direct current bus is coupled to the first pressure recovery generator and the closed-loop thermal cycle.

12. The system of claim 1, wherein the first pressure recovery generator comprises:
a turbine wheel configured to rotate based on an expansion of the fluid flowing from the fluid inlet to the fluid outlet;
a rotor coupled to the turbine wheel; and
a stator;
wherein the rotor configured to rotate within the stator and generate current upon rotation of the turbine wheel.

13. The system of claim 1, wherein the power electronics module is electrically coupled to one or both of the turbine generator of the closed-loop thermal cycle or a pump of the closed-loop thermal cycle.

14. The system of claim 1, wherein the power electronics module is configured to provide the current received from the first pressure recovery generator to the closed-loop thermal cycle to start the closed-loop thermal cycle, and wherein the system is configured to start a flow of the working fluid through the closed-loop thermal cycle by powering a turbine using the current received from the first pressure recovery generator.

15. The system of claim 1, wherein the temperature of the second fluid is different from the temperature of the third fluid.

16. The system of claim 15, wherein the second fluid is a high-temperature fluid and the third fluid is a low-temperature fluid.

17. A method comprising:
generating electrical current based on a pressure drop of a first fluid flowing from a first fluid inlet to a first fluid outlet of a first pressure recovery generator and based on a pressure drop of a second fluid flowing from a second fluid inlet to a second fluid outlet of a second pressure recovery generator, a temperature or pressure or both of the second fluid different from a temperature or pressure or both of the first fluid;
providing the electrical current to a power electronics module connected to a closed-loop thermal cycle; and
providing power to the closed-loop thermal cycle, wherein the power is a function of the electrical current directed to the power electronics module.

18. The method of claim 17, wherein the first fluid is a high-temperature fluid flowed through an open thermal system, and the method further comprises outputting the first fluid to exit the open thermal system to an evaporator of the closed-loop thermal cycle.

19. The method of claim 17, wherein the second fluid is a low temperature working fluid flowed through an open thermal system, and the method further comprises outputting the second fluid to exit the open thermal system to a condenser of the closed-loop thermal cycle.

20. The method of claim 17, further comprising directing a working fluid away from the closed-loop thermal cycle.

21. The method of claim 17, wherein the electrical current generated by the first pressure recovery generator is an alternating current, and the method further comprises converting the electrical current to a direct current prior to the electrical current being received by the power electronics module.

22. The method of claim 17, further comprising rotating a turbine wheel of a turbine generator of the closed-loop thermal cycle with the power provided from the power electronics module.

23. The method of claim 17, further comprising directing the electrical current to a utility grid or external loads.

24. The method of the claim 17, further comprising starting one or more components of the close-loop thermal cycle using current generated by at least one of the first pressure recovery generator or the second pressure recovery generator.

25. The method of claim 17, wherein the power is a function of the electrical current directed to the power electronics module from the first pressure recovery generator.

26. The method of claim 17, wherein the temperature of the first fluid is different from the temperature of the second fluid.

27. The method of claim 26, wherein the first fluid is a high-temperature fluid and the second fluid is a low-temperature fluid.

28. A system comprising:
a first pressure recovery generator configured to receive a first fluid at a first fluid inlet and generate current based on a pressure change of the first fluid flowing from the first fluid inlet to a first fluid outlet;
a second pressure recovery generator configured to receive a second fluid at a second fluid inlet and generate current based on a pressure change of the second fluid flowing from the second fluid inlet to a second fluid outlet, wherein a temperature or pressure or both of the second fluid is different from a temperature or pressure or both of the first fluid;
a closed-loop thermal cycle comprising:
an evaporator configured to heat a working fluid,
a turbine generator downstream from the evaporator and configured to generate current based on a pressure change of the working fluid flowing from an inlet to an outlet, and
a condenser downstream from the turbine generator and configured to cool the working fluid; and
a power electronics module configured to receive current from the first pressure recovery generator and current from the second pressure recovery generator, and provide the current to the closed-loop thermal cycle and to receive the current from the closed-loop thermal cycle.

29. The system of claim 28, wherein the evaporator is configured to heat the working fluid using the first fluid.

30. The system of claim 28, wherein the condenser is configured to cool the working fluid using the second fluid.

31. The system of claim 28, wherein the power electronics module is configured to direct a current generated by the first pressure recovery generator to one of the closed-loop thermal cycle or a utility grid.

32. The system of claim 28, wherein the closed-loop thermal cycle is an organic Rankine cycle.

33. The system of claim 28, wherein the temperature of the first fluid is different from the temperature of the second fluid.

34. The system of claim 33, wherein the first fluid is a high-temperature fluid and the second fluid is a low-temperature fluid.

* * * * *

UNITED STATES PATENT AND TRADEMARK OFFICE
CERTIFICATE OF CORRECTION

PATENT NO. : 9,322,300 B2
APPLICATION NO. : 13/556821
DATED : April 26, 2016
INVENTOR(S) : Parsa Mirmobin and Dennis Strouse It is certified that error appears in the above-identified patent and that said Letters Patent is hereby corrected as shown below:

On the Title Page

Item (73) (Assignee), In Line 1, After "LLC" insert -- (US) --.

In the Claims

In Column 11, In Line 53, In Claim 19, delete "low temperature" and insert -- low-temperature --, therefor.

In Column 12, In Line 9, In Claim 24, before "claim" delete "the".

In Column 12, In Line 10, In Claim 24, delete "close-loop" and insert -- closed-loop --, therefor.

Signed and Sealed this
Twentieth Day of August, 2019

Andrei Iancu
*Director of the United States Patent and Trademark Office*